US006947266B1

(12) United States Patent
Billingsley

(10) Patent No.: US 6,947,266 B1
(45) Date of Patent: Sep. 20, 2005

(54) POWER PROTECTION DEVICE

(76) Inventor: Richard J. Billingsley, P.O. Box 492, 4795 Mann Road, Rossland, British Columbia (CA) V0G 1Y0

( * ) Notice: Subject to any disclaimer, the term of this patent is extended or adjusted under 35 U.S.C. 154(b) by 43 days.

(21) Appl. No.: 10/078,523

(22) Filed: Feb. 21, 2002

(51) Int. Cl.[7] .................................... H02H 3/00
(52) U.S. Cl. .................................... 361/55; 361/104
(58) Field of Search .................... 361/93.9, 55, 57, 361/58, 91.1, 111, 117, 118, 126, 127, 103, 361/104

(56) References Cited

U.S. PATENT DOCUMENTS 4,903,161 A * 2/1990 Huber et al. .................. 361/56
6,646,839 B2 * 11/2003 Chaudhry et al. ............ 361/44
6,683,770 B1 * 1/2004 Marsh ........................ 361/111

* cited by examiner

*Primary Examiner*—Ronald Leja
(74) *Attorney, Agent, or Firm*—Antony C. Edwards

(57) ABSTRACT

A power protection device protects electronic equipment from AC supply system disturbances. An electronically controlled relay circuit passes power to connected equipment if the electrical supply system, to which the equipment is connected, is properly wired for continuity and correct polarity of line, neutral, and ground conductors, and the line voltage is within twenty-five percent of nominal levels. Thermal cut-offs are used as a back-up to the over-voltage protection provided by the electronically controlled relay circuit. These thermal cut-offs are connected in a way that when either or both trip, the relay of the electronically controlled relay circuit is de-energized and power is disconnected to the device output stage and connected equipment.

21 Claims, 2 Drawing Sheets

POWER PROTECTION DEVICE

FIELD OF THE INVENTION

The invention relates to devices for protecting electronic equipment from power-line disturbances such as pulsed and continuous electromagnetic interference (EMI), as well as extended over-voltages.

BACKGROUND OF THE INVENTION

For more than 20 years, companies have been developing and marketing products that are connected between the AC supply system and electronic equipment, in an attempt to protect the connected electronic equipment from a variety of power-line disturbances. Currently, many designs incorporate hybrid technology that combines both filter circuits, such as passive LC filter networks, and suppressor technologies, such as metal oxide varistors (MOVs), and gas discharge tubes (GDTs), in an attempt to protect against a broader range of disturbances than either technology on its own.

In order to divert common mode disturbances away from connected equipment, all protective products, regardless of technology, (i.e. filter, suppressor, hybrid, transformer based, etc.), must be connected to a properly wired supply system with continuity of the safety ground conductor. Loss of ground continuity results in loss of common mode protection for connected equipment. Without ground continuity common mode disturbances, such as ground-referenced transients, can find alternate paths through connected equipment to ground via network cabling and other properly grounded equipment. In the process, disruption and possible damage can occur to both the improperly and properly grounded equipment. In addition to causing potential power quality problems, loss of ground continuity increases the risk of electrical shock for operators of electronic equipment.

In the prior art, diagnostic devices such as power-line monitors exist that can be used to check wiring as well as the power quality conditions of supply system outlets and, if available, can be an important aspect of an overall power quality program. Power quality, however, is a dynamic condition that needs to be addressed for the life of the protected equipment. Facility renovations, for instance, can result in wiring faults such as loss of ground continuity for an outlet that was previously checked and found to be correctly wired. In addition, movement of equipment from one outlet to another outlet can result in potentially disruptive/damaging wiring faults.

In the applicant's experience, most conventional power protection designs pass power to the connected equipment and allow for continued equipment operation after loss of continuity of the safety ground conductor. Some available designs contain diagnostic indicators that turn on or off in response to various wiring fault conditions such as loss of ground continuity. The problem with this approach is that the operator must recognize and understand these diagnostic indicators before a potential problem can be rectified. Because most power protection products are installed behind the equipment to be protected, it is unlikely that the operator will ever notice the diagnostic indicators and a potentially problematic wiring fault.

Virtually every power protection design of which the applicant is aware uses several MOVs to suppress various modes of transient over-voltages. While MOVs can be very effective at suppressing transients, they are vulnerable to failure as a result of extended over-voltage conditions that cause one or more MOVs to conduct and continue to conduct for the duration of the over-voltage condition. Continued conduction causes these suppressor components to heat up and eventually fail. Failures of MOVs can be both a shock and fire hazard, and growing concern about this problem has resulted in significant revisions to applicable CSA and UL safety standards. In particular, so-called abnormal over-voltage tests have been added which simulate these extended over-voltage conditions. Compliance with the revised standards requires that the design respond to the abnormal over-voltage tests in a way that does not present a shock or fire hazard; that is components cannot fail short across supply system conductor pairs and failure of components cannot cause ignition of surrounding flammables.

To comply with revised CSA/UL safety standards, most power protection designs have been modified with the addition of one or more thermal cut-offs (TCOs). These TCOs are usually connected in series with one or more MOVs across various supply system conductor pairs, (that is shunt connected). During over-voltage conditions one or more MOVs will go into conduction and heat up. One or more TCOs, preferably sandwiched between the MOVs, will in turn heat up and will trip when its trip temperature is reached. Tripping of a TCO will, therefore, disconnect one or more MOVs from across various supply system conductor pairs and, designed correctly, can prevent potentially dangerous MOV failures.

While the above approach usually satisfies revised CSA and UL standards, it can result in continued operation of connected equipment after loss of some or all of the transient protection. Operation of one or more TCOs, in this type of design, will disconnect one or more suppressor components from across the line while allowing power to pass to the connected equipment. This allows for continued equipment operation after loss of this mode of transient protection. While some designs contain diagnostic lights that indicate loss of protection, similar to the problems associated with wiring fault indicators, these indicators may not be noticed on a product that is typically installed behind the connected equipment.

An alternative approach that has been used is to electrically connect the TCO in series with the line conductor on the supply side of the MOV(s) to be protected. With this configuration, tripping of the TCO will not only disconnect one or more MOVs from across various supply system conductor pairs, but will also disconnect power to the connected equipment. This will immediately notify the operator of a failure of the protection product. One of the difficulties with this approach stems from the fact that series connected TCOs must carry connected equipment load currents. The steady-state current carried by the TCO causes self-heating of the component that requires selection of a TCO with a much higher trip temperature in order to avoid nuisance tripping. This increases the difficulty of coordination of the TCO with the MOVs that it is protecting.

While the series connected TCO configuration can be used to break continuity of the line conductor, CSA and UL do not allow for a similar TCO configuration that breaks neutral continuity. The reason for this is that breaking of neutral continuity will shut off the connected equipment but will still pass line to ground voltages to the protection product outputs which could be a potential shock hazard for anyone servicing the equipment. CSA and UL, therefore, do not allow for breakage of neutral continuity unless it occurs simultaneously with breakage of line continuity, (such as a double pole circuit breaker).

As a result, designs that contain a "line-connected" TCO will also require at least one "shunt-connected" TCO in order to protect all modes of suppressor components. In such designs, tripping of shunt connected TCOs will disconnect one or more modes of transient protection while still allowing power to pass to connected equipment, leaving it vulnerable to subsequent transient and extended over-voltage conditions.

In addition to the problems described above, TCO-only designs provide a one-time solution to extended over-voltage conditions. Every time a TCO functions, the power-protection product must be returned to the manufacturer for repair or replacement. For a product that is designed to improve equipment uptime, this repair/replacement related downtime is a significant nuisance.

In the prior art, U.S. Pat. No. 6,229,682 purports to teach a device that contains circuitry that "senses the incoming voltage and electrically disconnects its output to the office equipment if a voltage surge above an established level is sensed." In the applicant's view, the problem with the design disclosed is that it only responds to line voltage levels above 165 VAC, a level that far exceeds the 130 VAC rating of the MOVs that are used in the device. In addition, the design contains no transient protection on the supply side of the sensing circuitry and relays. This may leave the supply side circuitry vulnerable to transient related damage when the line-connected relay disconnects power to the device output. Finally, the design contains no backup to the sensing/relay circuitry. Failure of the sensing/relay circuitry may result in a potentially dangerous failure of one or more device MOVs.

SUMMARY OF THE INVENTION

Supply system wiring faults, such as loss of ground continuity, can cause operational problems for electronic equipment; especially when the equipment is part of a network. In addition, loss of ground continuity increases the risk of electrical shock for equipment operators. The device according to the present invention responds to a variety of single and multiple wiring fault conditions, including loss of ground continuity, by disconnecting power to the connected equipment and illuminating a red diagnostic indicator to notify the equipment operator of a wiring problem. These wiring faults must be corrected before the device of the present invention will pass power to its output(s). This ensures the safe and reliable operation of connected equipment.

For electronic equipment that utilizes a 120 VAC configured power supply, extended over-voltage conditions, (that is line voltage levels greater than 150 VAC for several cycles), can cause equipment disruption and potential damage. The circuitry of the device according to one aspect of the present invention responds within two cycles to line voltage levels greater than 150 VAC by disconnecting power to its load side, thereby protecting secondary suppression stage components as well as connected equipment from over-voltage related damage. In one embodiment, when line voltage levels return to nominal levels, the circuitry automatically reconnects power to its load side and connected equipment.

The improvements according to the present invention may be summarized as including one or more of:

a) Filtering all modes of conducted interference, (continuous EMI), to equipment compatible levels.

b) Suppressing all modes of conducted transients, (pulsed EMI), to equipment compatible levels.

c) Protecting connected equipment and secondary suppression stage components from over-voltage related damage by automatically disconnecting power to the load side of the device, and connected equipment in response to line voltage levels above 150 VAC.

d) Automatically reconnecting power to the load side and connected equipment once the line voltage returns to nominal levels.

e) Assisting the safe and reliable operation of connected equipment by passing power to said equipment if, and only if, the supply system to which the product is connected is correctly wired, (that is continuity and correct polarity of line, neutral, and ground conductors).

f) Utilizing TCOs as a backup to the electronically controlled relay circuit (ECR circuit), to ensure a safe response to over-voltage conditions in the event of failure of the ECR circuit.

g) Configuring the TCOs such that if either trips, the relay of the ECR circuit is de-energized and power is disconnected to the product load side and connected equipment; (that is does not allow for continued equipment operation after functioning of either/both TCOs).

h) Connecting the TCOs in a shunt configuration such that they do not carry connected equipment currents allowing for a lower trip temperature and improved coordination with secondary suppression stage MOVs.

i) Providing a go/no-go diagnostic circuit, in addition to automatic disconnection of connected equipment, in order to notify the operator of a continuous over-voltage and/or wiring fault condition.

In summary, the power protection device of the present invention includes line, neutral, and ground terminals on a supply side of the device for connection to line, neutral, and ground terminals, respectively of an electrical supply system, line, neutral, and ground terminals on the load side of the device for connection to line, neutral, and ground terminals, respectively of one or more pieces of electronic equipment, an EMI filter and suppressor circuit cooperating in combination between the supply side and the load side and cooperating with an electronically controlled relay circuit, (ECR circuit) adapted to conduct power to the load side and the connected equipment only if the supply system is correctly wired, and the line voltage is generally within twenty-five percent of nominal levels, wherein the ECR circuit is not intended to be limiting in its scope but, rather, is intended to include all types of power switching devices where energizing the switching device causes it to conduct current via contacts, terminals, etc.

In a preferred embodiment first and second thermal cut-offs and three metal-oxide varistors are provided, wherein the first and second thermal cut-offs are physically sandwiched between the three metal-oxide varistors and electrically connected to the electronically controlled relay circuit means, such that when either or both of the thermal cut-offs trip, the electronically controlled relay circuit means disconnects power to the device load side and the connected equipment. Advantageously each thermal cut-off is shunt connected so as to not carry connected equipment load currents. This preferred embodiment of two thermal cut-offs and three metal oxide varistors is not intended to be limiting in scope but, rather, is intended to also include one or two varistors in combination with one or two thermal cut-offs in applications where all modes of transient over-voltage protection is not required.

The electronically controlled relay circuit, (ECR circuit), consists of relay control circuit means, and an electromechanical relay, (relay). The relay control circuit means advantageously includes detection means so as to energize the relay means so as to close the relay means when the supply system is correctly wired and the voltage is generally within twenty-five percent of the nominal voltage. Power is thereby passed to the load side of the device. The relay control circuit means removes relay coil voltage causing the relay means to open when the relay control circuit means detects incorrect wiring of the supply system or over-voltage generally beyond 125% of nominal.

The device may further include a diagnostic circuit cooperating with the ECR circuit means. The diagnostic circuit is adapted to illuminate a first colour (for example green) in response to a correctly wired supply system and voltage levels acceptably close to nominal voltage levels when power is passed by the relay means to the device load side and connected equipment. The diagnostic circuit is adapted to illuminate a second colour (for example red) in response to supply system wiring faults and/or abnormal over-voltage conditions when the relay means disconnects power to the load side and the connected equipment.

The relay control circuit means may detect loss of ground continuity, loss of line and/or neutral continuity, and reverse polarity wherein line and neutral are reversed in the supply system, and remove relay coil voltage causing the relay means to disconnect power to the load side and the connected equipment.

The relay control circuit means may also detect extended over-voltage conditions and remove relay coil voltage causing the relay means to disconnect power to the load side and the connected equipment for the duration of the over-voltage condition, and may reconnect power to the load side and the connected equipment when the relay control circuit means detects correction of any supply system wiring faults and once the line voltage has returned to nominal levels.

Reliable and safe equipment operation is ensured in the present invention by:

a) providing an EMI filter and multi-stage suppressor circuit cooperating in combination between the supply side and the load side, b) providing an electronically controlled relay circuit means consisting of a relay control circuit and a relay cooperating with the filter and the suppressor, c) energizing the relay means so as to conduct power to the load side and the connected equipment only if the supply system is correctly wired, and the line voltage is generally within twenty-five percent of nominal levels.

The method may include the further steps of providing a backup to an over-voltage response of the electronically controlled relay circuit means including, two thermal cut-offs sandwiched between three metal-oxide varistors wherein heating of one or more of the metal-oxide varistors due to continued conduction triggers one or both thermal cut-offs thereby removing coil voltage from the relay means and causing disconnection of power to the device load side and connected equipment.

DETAILED DESCRIPTION OF EMBODIMENTS OF THE INVENTION

Figure 1:
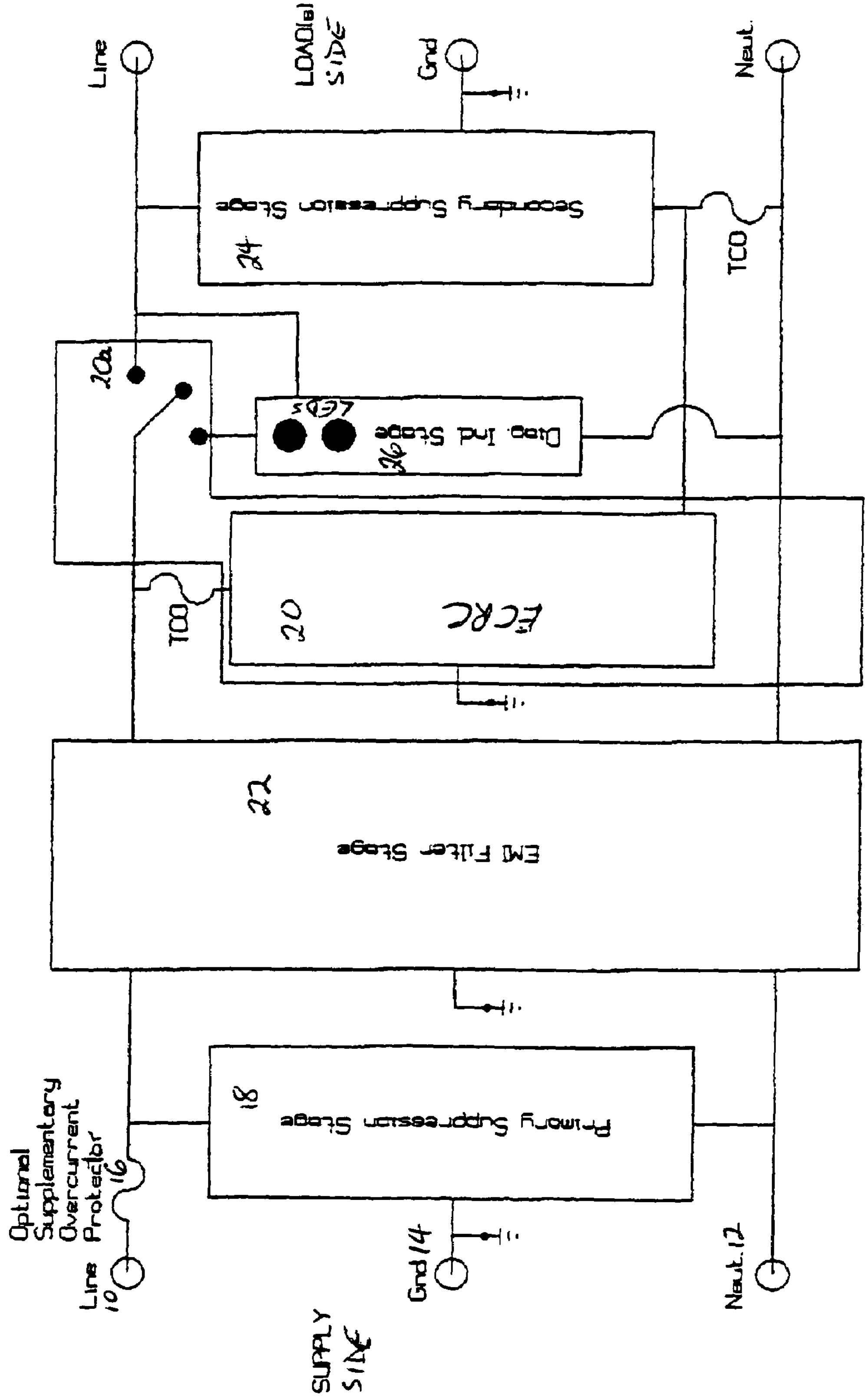
FIG. 1 is a block diagram of a preferred embodiment of the present invention illustrating supplementary over-current protection, primary suppression stage, EMI Filter Stage, ECR circuit, TCOs, diagnostic circuit, and secondary suppression stage.

FIG. 1 is a block diagram of the preferred embodiment of the invention. The illustration includes supply side line 10, neutral 12, and ground 14 terminals that connect to the line, neutral, and ground contacts, respectively, of the supply system (not shown).

An optional supplementary over-current protector 16 (a thermal circuit breaker or fuse), is connected in series with line conductor 10, and is used to protect the device and connected equipment (not shown) from over-current conditions such as those caused by a connected equipment fault.

A primary suppression stage, which utilizes both MOV and GDT components as would be known to one skilled in the art, is connected across the line, neutral, and ground conductor pairs on the load side of supplementary overcurrent protector 16, and is used as primary transient protection for the ECR circuit 20 and connected equipment. Primary suppression stage 18, as well as EMI filter stage 22 and ECR circuit 20, is designed to withstand worst-case over-voltage conditions, for example 240 VAC for a 120 VAC rated supply system. This stage, therefore, does not require protection from over-voltage conditions.

EMI filter stage 22, which consists of a passive second order normal and common mode LC filter network, is connected across the line, neutral, and ground conductor pairs on the load side of Primary suppression stage 18. This stage is used to filter normal and common mode disturbances in the radio frequency spectrum.

ECR circuit 20 is connected across the line, neutral, and ground conductor pairs on the load side of EMI filter stage 22. ECR circuit 20 includes a relay control circuit and an electromechanical relay (relay).

The ECR circuit is designed to pass or otherwise conduct power to the connected equipment if, and only if, the supply system is correctly wired, (continuity and correct polarity of line, neutral and ground), and the line voltage is within 25% of nominal levels, for example 120 VAC. With a properly wired supply system and normal line voltage levels, the electromechanical relay (EMR) 20*a* (see also FIG. 2) is energized and power is connected to the load side and connected equipment.

The ECR circuit responds to supply system wiring faults and/or extended over- voltage levels, for example above 150 VAC, by removing relay coil voltage causing the relay to disconnect power to the load side and connected equipment. In the case of a wiring fault condition, the fault must to be repaired before the ECR circuit 20 will pass power to the load side and the connected equipment. In the case of an over-voltage condition, the line voltage must return to nominal levels before ECR circuit 20 automatically reconnects power to the load side and connected equipment.

In one embodiment a diagnostic circuit 26 is provided which may include a bi-color, three terminal red/green light emitting diode (LED), protective diodes, and a current limiting resistor. When the relay is energized and power is passed to the load side, the green side of the bi-color LED is illuminated to indicate a correctly wired supply system and nominal line voltage levels. In the un-energized state, the relay illuminates the red side of the bi-color LED through the relay's normally closed contact. The illuminated red LED indicates a wiring fault and/or over-voltage condition.

Secondary suppression stage 24 includes MOV(s) that are connected across the line, neutral, and ground conductor pairs on the load side of the ECR circuit 20. The purpose of secondary suppression stage 24 is to provide improved transient protection for the connected equipment. The MOVs in this stage are rated for line voltage levels of 150 VAC, and as such, must be protected against abnormal over-voltage levels of 150 to 240 VAC.

In the event that a faulty ECR circuit 20 does not respond to an over-voltage condition, one or more MOVs in the secondary suppression stage 24 will limit the output voltage levels to about 240 Vpeak, a level that is compatible with 120 VAC rated power supplies. Continuous conduction by an MOV in secondary suppression stage 24 will cause the MOV(s) to heat up. This will cause one or more of the TCOs sandwiched between the MOVs of secondary suppression stage 24, to heat up and trip when the TCO trip temperature is reached. Operation of one or both TCOs will disconnect one or more MOVs from across various supply system conductor pairs, thereby, preventing a potentially dangerous MOV failure. The TCOs that are used as a backup to the over-voltage response of the ECR(C) circuit, are configured in a way that, if either trips, the relay is de-energized and power is disconnected to the load side including secondary suppression stage 24 and connected equipment. Unlike prior art designs, the design of the present invention will not allow for continued equipment operation after operation of either TCO.

Line, neutral, and ground terminals are included on the load side to connect the device to one or more pieces of electronic equipment.

Figure 2:
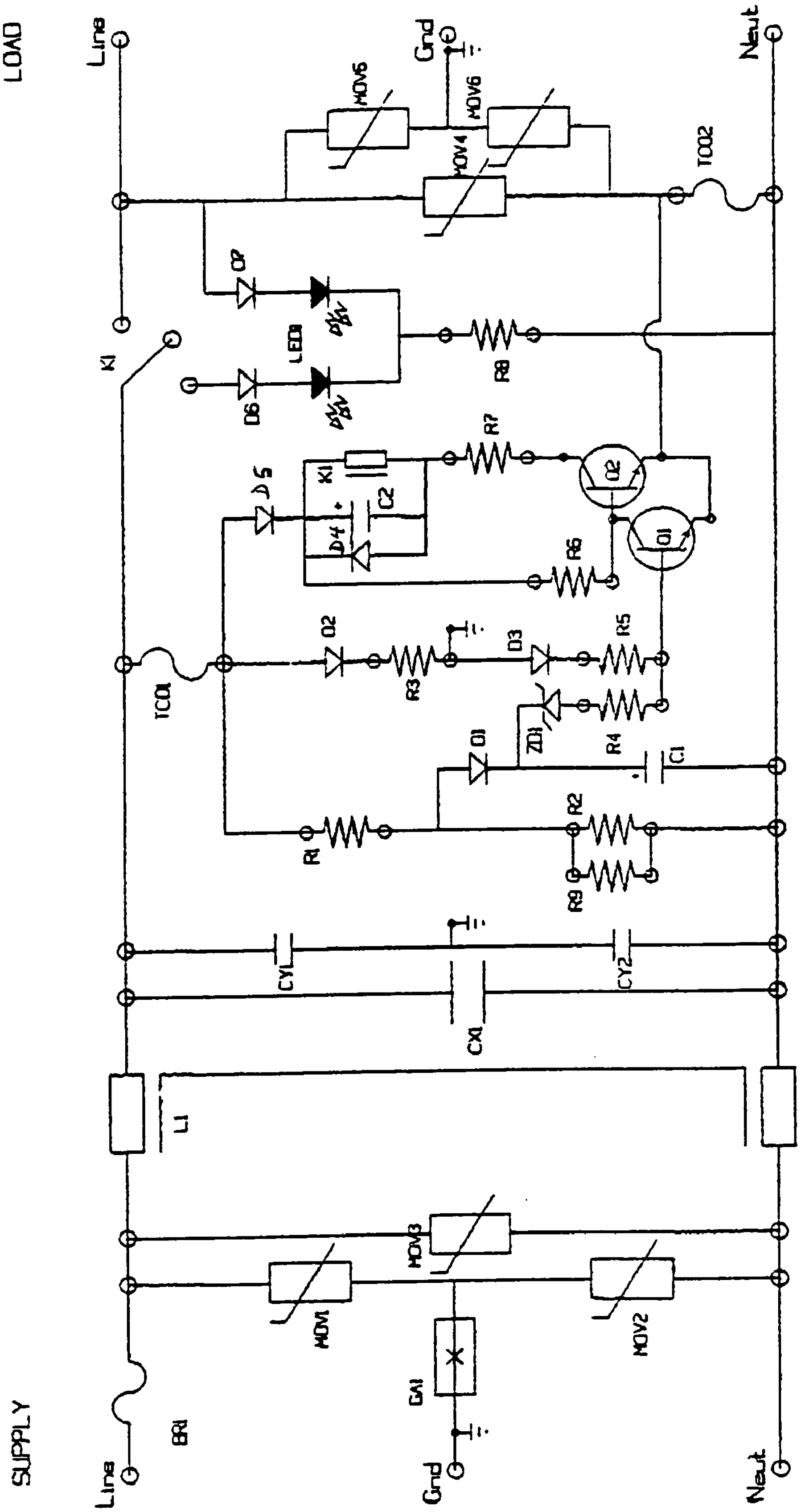
FIG. 2 is a schematic diagram of a preferred embodiment of the present invention.

FIG. 2 is a schematic diagram of the preferred embodiment of the present invention.

Supply side line, neutral, and ground terminals are provided for connection to line, neutral, and ground, respectively, of the supply system. This can be accomplished in a cord connected product, for instance, with a NEMA 5-15P molded plug that is connected to a standard 5-15R duplex receptacle. These connections could also be made in a direct-plug-in product using a built-in 5-15P plug that is connected to a duplex receptacle. Finally, connections to the supply system may be accomplished using short wires, terminal blocks, etc. in a permanently connected product, for instance. Similarly, load side line, neutral, and ground terminals are provided for connection to line, neutral, and ground terminals of one or more pieces of connected equipment. As per previously, this can be accomplished with a variety of 5-15R receptacles in cord-connected and direct-plug-in products or wires, terminal blocks, etc., in a permanently connected product.

BR1 is either a thermal circuit breaker or fuse that provides supplementary over-current protection, as explained previously.

The primary suppression stage 18 is connected between line, neutral and ground, on the load side of the supplementary over-current protection 16 stage, and includes three metal oxide varistors, MOV1, MOV2, and MOV3, as well as gas discharge tube, GA1. This stage is designed to withstand steady state voltages of up to 240 VAC and, as such, does not require any protection from abnormal over-voltage conditions.

The EMI filter stage 22 is connected between line, neutral, and ground on the load side of primary suppression stage 18 and includes inductor L1, X-capacitor, CX1, and Y-capacitors, CY1 and CY2. This stage can also withstand over-voltage levels of up to 240 VAC and does not require protection against abnormal over-voltage conditions.

Connected between line, neutral, and ground on the load side of the EMI filter stage is the electronically controlled relay circuit (ECR) circuit, which includes an electro-mechanical relay K1 and relay control circuitry (R1–R7, R9, D1–D5, C1, C2, Q1, Q2, and ZD1).

With continuity of line and neutral conductors, and under normal line-voltage conditions, 120 VAC will be available between the line and neutral conductor pair. This will produce base-drive to transistor, Q2, via the D5, R6, and Q2 base-to-emitter path. This base-drive will turn on Q2 which will connect half-wave rectifier circuit D5, C2, and R7 across the line to neutral conductor pair. This half-wave rectifier circuit produces DC voltage to power the electro-mechanical relay. D4 provides for transient suppression during discharge of the relay coil voltage.

With continuity and correct polarity of line, neutral, and ground conductors, little or no steady state voltage will exist across the neutral to ground conductor pair. As a result, little or no base-drive to Q1 will be generated and Q1 will be off. When Q1 is off, Q2 is on, DC voltage is produced across the relay coil and the relay K1 is energized. With the relay coil energized, continuity of the line conductor is made via the relay common and normally open contacts and power is passed to the load side and connected equipment.

Loss of ground continuity results in Q1 base-drive via D2, R3, D3, R5, and the Q1 base to emitter junction that turns on Q1, drawing base-drive away from Q2. With continuity of line and neutral conductors, when Q1 is off, Q2 will be on and K1 will be energized. Similarly, when Q1 is on, Q2 will be off and the DC voltage across the relay coil will quickly decay until K1 turns off and disconnects power to the load side and connected equipment. As would be known to one skilled in the art, appropriate selection of C2 will ensure a fairly stable dc coil voltage, yet allow for a quick response to a variety of wiring fault and over-voltage conditions, as will be explained. Loss of ground continuity, therefore, causes dc voltage to be removed from the relay coil, which causes the relay to disconnect power to the load side and connected equipment.

Reverse polarity, (that is supply system line and neutral conductors reversed), will result in 120 VAC across the neutral to ground conductor pair. Similar to the loss of ground condition, this will turn on Q1, turn off Q2, cause dc voltage across the relay coil to decay which will quickly turn off relay K1 and disconnect power to the load side and connected equipment.

Loss of line and/or neutral continuity will remove dc voltage from across the relay coil which will turn off relay K1 and disconnect power to the load side and connected equipment.

Unregulated, half wave rectifier R1, R2/R9, and D1 produces a dc voltage across C1 that is directly proportional to the line to neutral voltage. As the line voltage increases, so does the dc voltage across C1. When this voltage exceeds the breakdown voltage of zener diode, ZD1, plus the forward drop of the Q1 base to emitter junction, base-drive will be provided to transistor, Q1. This will turn on Q1, turn off Q2, cause the dc voltage across the relay coil to decay and quickly turn off relay K1 and disconnect power to the load side and connected equipment. By selecting appropriate values of R1, R2/R9, C1, ZD1, and R4, this over-voltage detection circuitry can be designed to disconnect power to the load side and connected equipment in response to potentially damaging over-voltage conditions, for example steady state voltages above 150 VAC. By appropriately selecting values of R1, R2/R9, and C1, the response time of this over-voltage detection circuitry can be adjusted to respond to extended over-voltage conditions and not to transient conditions.

Thus, as may be seen, power is passed to the device load side and connected equipment if, and only if, the supply system is correctly wired, (that is continuity and correct polarity of line, neutral, and ground conductors), and the line voltage is within 25% of nominal levels, (for example 120 VAC).

As previously explained, thermal cut-offs, TCO1 and TCO2, provide a back up to the over-voltage response of the ECR circuit. Failure of either the relay control circuit and/or relay may result in power being passed to the load side and connected equipment during abnormal over-voltage conditions. This may cause continued conduction of one or more of the secondary suppression stage varistors, MOV4, MOV5, and/or MOV6. Unless this condition is quickly interrupted, a potentially dangerous failure of one or more of these varistors could result.

With TCO1 and TCO2 physically sandwiched between MOV4, MOV5, and MOV6, continued conduction of one or more of these varistors will cause TCO1 and/or TCO2 to heat up and trip when their trip temperature is reached. In the case of operation of TCO1, the ECR circuit will be disconnected from across the line to neutral conductor pair that will cause the relay coil voltage to decay and quickly turn off the relay K1. This will disconnect power to the load side and connected equipment protecting both from over-voltage related damage. In the case of operation of TCO2, MOV4 and MOV6 will be disconnected from across the line to neutral and neutral to ground conductor pairs, respectively, which will prevent a potentially dangerous failure of these varistors. In addition, operation of TCO2 will disconnect the ECR circuit from across the line to neutral conductor pair, as shown, which will turn off relay K1 and disconnect power to the load side and connected equipment.

Unlike prior art designs, this TCO configuration provides back up over-voltage protection to secondary suppression stage 24 varistors without allowing for continued and unprotected operation of connected equipment; (that is when TCO1 and/or TCO2 functions, relay K1 is turned off and power is disconnected to the load side and connected equipment). The above over-voltage back-up is achieved with shunt connected TCOs which do not carry connected equipment load currents and can, therefore, be better coordinated with varistors, MOV4, MOV5, and MOV6.

The diagnostic circuit 26, consisting of bi-color indicator, LED1, protective diodes, D6 and D7, and current limiting resistor, R8, provides a visual indication of the conditions of the supply system to which the device is connected. With a properly wired supply system and nominal line voltage levels, power is passed to the load side and connected equipment. This line to neutral voltage illuminates the green side of the bi-color indicator, LED1, via the D7, green side of LED1, and R8 path. Supply system wiring faults and/or abnormal over-voltage conditions cause relay K1 to switch to the open position. This illuminates the red side of the bi-color indicator, LED1, via the D6, red side of LED1, and R8 path. As can be seen, the diagnostic circuit 26 provides a go/no-go indication of the conditions of the supply system to which the device is connected.

The secondary suppression stage 24, may consist of 150 VAC rated varistors, MOV4, MOV5, and MOV6 that provide improved transient protection for connected equipment. Because this stage may be rated for steady state voltage levels of about 150 VAC, it must in that case be protected from abnormal over-voltage conditions of 150 to 240 VAC.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A power protection device comprising:

line, neutral, and ground terminals on a supply side of said device for connection to line, neutral, and ground terminals, respectively of an electrical supply system, line, neutral, and ground terminals on a load side of said device for connection to line, neutral, and ground terminals, respectively of one or more pieces of electronic equipment, an EMI filter and suppressor cooperating in combination between said supply side and said load side and cooperating with an electronically controlled relay circuit comprising a relay control circuit means and relay means adapted to conduct power to said load side and the connected equipment only if the supply system is correctly wired, and the line voltage is generally within twenty-five percent of nominal levels, and a backup to an over-voltage response of said relay means, said relay control circuit means including at least one thermal cut-off positioned adjacent to at least one metal-oxide varistor whereby heating of said at least one metal-oxide varistor due to continued operation triggers tripping of said at least one thermal cut-off thereby causing disconnection of power to the device load side and connected equipment, wherein each thermal cut-off of said at least one thermal cut-off is shunt connected so as to not carry connected equipment load currents.

2. The device of claim 1 wherein said relay control circuit means includes detection means so as to energize said relay means and pass power to said device load side and connected equipment when the supply system is correctly wired and the voltage is generally within twenty-five percent of the nominal voltage, said relay control circuit means de-energizing said relay means and disconnecting power to said device load side when said detection means detects incorrect wiring of the supply system and/or over-voltage conditions generally above twenty-five percent above the nominal voltage.

3. The device of claim 2, wherein said relay control circuit means automatically energizes said relay means hereby reconnecting power to said load side and the connected equipment when said detecting means detects correction of any wiring faults in the supply system.

4. The device of claim 1 wherein said at least one metal-oxide varistor includes a pair of metal-oxide varistors and said at least one thermal cut-off includes a thermal cut-off sandwiched between said pair of metal-oxide varistors.

5. The device of claim 1 further comprising a diagnostic circuit cooperating with said electronically controlled relay circuit and adapted to illuminate a first colour in response to a correctly wired supply system and nominal voltage levels when power is passed by said relay means to said load side and the connected equipment, and wherein said diagnostic circuit is adapted to illuminate a second colour in response to single or multiple supply system wiring faults and/or abnormal over-voltage conditions when said relay means disconnects power to said load side and the connected equipment.

6. The device of claim 1, wherein said relay control circuit means detects loss of ground continuity and de-energizes said relay means disconnecting power to said load side and the connected equipment.

7. The device of claim 1, wherein said relay control circuit means detects loss of line and/or neutral continuity and de-energizes said relay means disconnecting power to said load side and the connected equipment.

8. The device of claim 1, wherein said relay control circuit means detects reverse polarity wherein line and neutral are reversed in the supply system, and de-energizes said relay means disconnecting power to said load side and the connected equipment.

9. The device of claim 1, wherein said relay control circuit means detects extended over-voltage conditions, and de-energizes said relay means disconnecting power to said load side and the connected equipment for the duration of the over-voltage condition.

10. The device of claim 9 wherein said relay control circuit means comprises detecting means for detecting extended over-voltage conditions and means for automatically re-energizing said relay means and reconnecting power to said load side and the connected equipment once the line voltage has returned to nominal levels.

11. The device of claim 1 wherein said at least one thermal cut-off are first and second thermal cut-offs, and wherein said at least one metal-oxide varistor are three metal-oxide varistors, and wherein said first and second thermal cut-offs are physically sandwiched between said three metal-oxide varistors and electrically connected to said electronically controlled relay circuit, such that when either or both of said thermal cut-offs trip, said electronically controlled relay circuit disconnects power to said output and the connected equipment.

12. In a power protection device which includes line, neutral, and ground terminals on a supply side of said device for connection to line, neutral, and ground terminals, respectively of an electrical supply system, line, neutral and ground terminals on the load side of said device for connection to line, neutral, and ground terminals, respectively of one or more pieces of electronic equipment, a method of electronic equipment protection comprising the steps of a) providing an EMI filter and suppressor cooperating in combination between said supply side and said load side,
b) providing an electronically controlled relay circuit comprising a relay control circuit means and relay means cooperating with said filter and said suppressor,
c) energizing said relay means so as to conduct power to said load side and the connected equipment only if the supply system is correctly wired, and the line voltage is generally within twenty-five percent of nominal levels,
d) providing a backup to an over-voltage response of said relay means, said relay control circuit means including at least one thermal cut-off positioned adjacent to at least one metal-oxide varistor whereby heating of said at least one metal-oxide varistor due to continued operation triggers tripping of said at least one thermal cut-off thereby causing disconnection of power to the device load side and connected equipment,
e) shunt connecting each thermal cut-off of said at least one thermal cut-off so as to not carry connected equipment load currents.

13. The method of claim 12 wherein said relay control circuit means includes detection means so as to energize said relay when the supply system is correctly wired and the voltage is generally within twenty-five percent of the nominal voltage to thereby pass power to said load side, and de-energizing said relay means thereby disconnecting power to said load side and connected equipment when said detection means detects incorrect wiring of the supply system or over-voltage generally above twenty-five percent above the nominal voltage.

14. The method of claim 13, further comprising the step of automatically reconnecting power to said load side and the connected equipment when said detecting means detects correction of any wiring faults in the supply system.

15. The method of claim 12 further comprising the step of providing a pair of metal-oxide varistors and sandwiching a thermal cut-off of said at least one thermal cut-off between said pair of metal-oxide varistors.

16. The method of claim 12 further comprising the step of providing a diagnostic circuit cooperating with said relay control circuit means and said relay means, and illuminating a first colour in response to a correctly wired supply system and nominal voltage levels when power is passed by said relay means to said load side and the connected equipment, and illuminating a second colour in response to single or multiple supply system wiring faults and/or abnormal over-voltage conditions when power is disconnected by said relay means to said load side and the connected equipment.

17. The method of claim 12, further comprising the step of detecting loss of ground continuity and de-energizing said relay means thereby disconnecting power to said load side and the connected equipment.

18. The method of claim 12, further comprising the step of detecting loss of line and/or neutral continuity and de-energizing said relay means thereby disconnecting power to said load side and the connected equipment.

19. The method of claim 18 further comprising the step of detecting extended over-voltage conditions and automatically reconnecting power to said load side and the connected equipment once the line voltage has returned to nominal levels.

20. The method of claim 12, further comprising the step of detect reverse polarity wherein line and neutral are reversed in the supply system, and de-energizing said relay means disconnecting power to said load side and the connected equipment.

21. The method of claim 12, further comprising the step of detecting extended over-voltage conditions, and de-energizing said relay means thereby disconnecting power to said load side and the connect equipment for the duration of the over-voltage condition.

* * * * *